United States Patent Office 3,325,460
Patented June 13, 1967

3,325,460
PROCESS FOR THE CONTINUOUS PREPARATION OF ETHYLENE/VINYL ACETATE COPOLYMERS USING SERIALLY ARRANGED REACTION ZONES
Wolf-Dietrich Schellenberg, Opladen, and Herbert Bartl, Cologne-Stammheim, Germany, assignors to Farbenfabriken Bayer Aktiengesellschaft, Leverkusen, Germany, a corporation of Germany
No Drawing. Filed Dec. 1, 1964, Ser. No. 415,150
Claims priority, application Germany, Dec. 23, 1963, F 41,617
2 Claims. (Cl. 260—87.3)

This invention relates to a process for the continuous preparation of ethylene/vinyl acetate copolymers which contain large amounts of copolymerised vinyl acetate yet have, at the same time, excellent processing properties.

It is already known that high molecular weight ethylene/vinyl acetate copolymers with low vinyl acetate contents (up to 35%) can continuously be prepared by polymerisation of the monomers under specific conditions when tertiary butanol is employed as reaction medium in a polymerisation reactor by adding the monomer mixture and removing the polymer from the reactor. In this way, high-quality polymers can only be prepared over prolonged periods by keeping the monomer conversion at a low level, i.e. below 30%, or by using large amounts of tert. butanol, i.e. many times the amount of vinyl acetate, since otherwise large quantities of substances which swell are very quickly formed and polymerisation has to be stopped.

If an attempt is made similarly to prepare copolymers with considerably higher vinyl acetate contents, for example of the elastomeric type suitable for the manufacture of rubber products or for admixture with other elastomers or plastics, the polymers obtained as elastomers have poor processing properties although they have fairly high molecular weights (viscosity number $[\eta] = >0.8$). The manufacture of rubber products by processing on rolls, extrusion or vulcanisation is attended by the following and other disadvantages: inadequate strength of the products before vulcanisation, undesired swelling on extrusion, bubble formation in the vulcanisate and poor mould-release properties at high temperatures.

It has now been found that high-grade ethylene/vinyl acetate copolymers containing 40–75% by weight of copolymerized vinyl acetate exhibiting excellent processing properties can be prepared by continuous polymerisation in tert. butanol as reaction medium if ethylene and vinyl acetate are polymerised at temperatures from 20 to 120° C. under an ethylene pressure of at least 50 atm. in a weight ratio of 1.8:1 to 0.5:1 and with a weight ratio of vinyl acetate to tert. butanol of 1:0.1 to 1:3, preferably 1:0.5 to 1:2. The reaction is carried out in at least two reaction vessels arranged in series and the extent of monomer conversion to polymer in the first chamber must be lower than in the following chambers. Polymerisation is continued until the total monomer conversion is at least 40% and until the solids content of the polymer solutions is at least 25% on completion of polymerisation and on removal of the ethylene. Residual monomeric vinyl acetate may even be regarded as the solvent here.

The polymerisation of ethylene to highly concentrated solutions and to a high monomer conversion of the ethylene is not usual on an industrial scale in high-pressure polymerisation, particularly in continuous processes (in most instances, the monomer conversion is less than 10%), because the heat is too difficult to dissipate during polymerisation. The polymerisation may even become explosive in this case, and the tendency of the polymers to cross-link is so great that the industrial practicability of the polymerisation would be called to question, quite apart from the lower quality of the polymers.

The trouble-free polymerisation by the process according to the invention is made possible above all by the fact that the solvent/monomer mixture is passed under polymerisation conditions through several, but at least two, reaction vessels (e.g. autoclaves) arranged in series. The monomer conversion in the first autoclave must be lower than in all the following autoclaves. In this respect, it is advantageous, in accordance with a preferred embodiment of the process, so to control the polymerisation that the increase in conversion in each autoclave is smaller than in the following autoclave. This may be achieved, for example, by suitably graduating the polymerisation temperature, or by different residence times, in which case autoclaves of different sizes are arranged one after the other in an appropriate sequence. The polymerisation temperature should lie between 20 and 120° C., preferably between 35 and 85° C.

It is even possible, by adapting this process to obtain, by polymerisation, highly concentrated copolymer solutions with a solids content of up to 50% and higher, without endangering process control.

Stirrable autoclaves with a cubic capacity of 0.1 to 5 m.$^3$ may be used as reaction chambers. If possible, even larger autoclaves may be employed, but considerably smaller autoclave units are out of the question if it is desired to obtain products with favourable processing properties, because it has been found that even the size of the reaction chambers affects the quality of the products. The reaction chamber should, expediently, be no smaller than 0.1 m.$^3$. Polymers with a low Mooney value are mainly obtained in small units, e.g. 5 l.-autoclaves.

The ethylene pressure under which the polymerisation is carried out should be at least 50 atm., but, in principle has no upper limit. For reasons of economy and safety, however, the lowest possible polymerisation pressure should be employed. This pressure can be as low as 500 atm.

The solvent used in the claimed process is tert. butanol which may optionally contain small quantities of other solvents such as, e.g., isooctane. Since the use of large quantities of tert. butanol actually reduces the Mooney value of the polymers, the quantity of tert. butanol should not exceed 0.1 to 3 parts, and preferably amounts to 0.5 to 2 parts, of the quantity of vinyl acetate used.

Organic peroxides such as benzoyl peroxide, lauroyl peroxide, peroxydicarbonates, such as diisopropyl peroxydicarbonate, dichlorobenzoyl peroxide, acetyl peroxide or nitrogen compounds which form radicals by thermal decomposition, such as α,α'-azodiisobutyronitrile, may be used as polymerisation initiators. These initiators are used in quantities of 0.02 to 0.5% by weight, based on polymerisable monomers.

It was surprising that the good processibility of the polymers depends on the polymerisation being carried out to a large extent in highly concentrated solution. The processing properties of elastomers may be summarily identified by the polymer viscosity as expressed, for example, by the Mooney viscosity. If polymerisation is carried out under more or less constant polymerisation conditions to form solutions whose final concentrations are below 25%, Mooney values of less than 15 and 10 are obtained, whilst Mooney values of ML–4' (100° C.)= 20–40 and even higher are readily obtainable by the process according to the invention.

It is possible by using the polymers prepared by the present process which have Mooney values of higher than 20 to produce vulcanisable rubber mixtures with improved extrudability and dimensional stability in the vulcanising process. In addition, there is no longer any bubble formation during vulcanisation, such as occurs in the case of polymers with low Mooney values. Even when the polymers are mixed with other elastomers and plastics, the improvement in their structure is noticeable with advantage, for example, in combination with polyvinyl chloride for the production of an impact-resistant hard vinyl chloride polymer.

*Example 1*

27.7 kg. of ethylene and 70 l. of a mixture of 33.34% of vinyl acetate, 66.60% of tert. butanol and 0.06% of $\alpha,\alpha'$-azodiisobutyronitrile are introduced hourly under pressure into a high-pressure chamber with a total volume of 1,000 l. which is divided up into 2 stirrer autoclaves each with a capacity of 200 l. and 2 stirrer autoclaves each with a capacity of 300 l. All the autoclaves are operated at an internal temperature of 67° C. and under a pressure of 250 atm. Once equilibrium has been reached, the conversion of vinyl acetate is 30% and that of ethylene 25%. The ethylene-free polymer solution has a solids content of 20%. The Mooney value of the dried polymer varies between 10 and 15. The copolymer contains 45 to 47% vinyl acetate.

*Example 2*

The procedure of Example 1 is repeated, except that the internal temperatures of the autoclaves are adjusted to the following levels: 1: 66.5° C., 2: 69° C., 3: 71° C., and 4: 74° C.

Once equilibrium has been reached, the total conversion of vinyl acetate is 72% and that of ethylene is 61%. The ethylene-free polymer solution has the following concentrations in each autoclave: 1: 6%, 2: 16%, 3: 28%, 4: 42%. The Mooney value of the dried copolymer which contains 45% vinyl acetate is now 25 to 30, although the polymerisation temperature is higher on average than in the comparison test.

*Example 3*

If the reaction conditions of Example 2 are modified so that the concentration in the first autoclave is as high as 20%, e.g. by using a 400 l. autoclave as autoclave 1 instead of a 200 l. autoclave, as in Example 2, or by raising the reaction temperature, or by purifying the monomers beforehand to remove the last traces of inhibiting substances, so that the increase in concentration in the other autoclaves is small as compared with the first (concentration in autoclave 2, 23%, in autoclave 3, 30%, and in autoclave 4, 35%), the Mooney value of the copolymer is still 20, but the strength of a valcanised mixture with silica fillers is only 100 kg./cm.$^2$. In contrast, a vulcanised mixture of identical composition prepared from a polymer obtained according to Example 2, has a strength of 145 kg./cm.$^2$.

We claim:

1. In a process for the continuous preparation of copolymers of ethylene and vinyl acetate containing 40 to 75% by weight of copolymerized vinyl acetate in tertiary butanol as the reaction medium, the improvement which comprises introducing, as feed, ethylene, vinyl acetate and tertiary butanol together with 0.02 to 0.5% by weight, based on the weight of the monomers, of an organic free radical forming polymerization initiator under an ethylene pressure of about 50 to about 500 atmospheres, the feed weight ratio of ethylene to vinyl acetate being in the range of 1.8:1 to 0.5:1 and the feed weight ratio of vinyl acetate to tertiary butanol being in the range of 1:0.1 to 1:3, into a first reaction zone, maintaining the temperature thereof between 20 and 120° C. and passing resulting product through at least one additional and serially arranged reaction zone under reaction conditions, including a temperature between 20 and 120° C. promoting monomer conversion to copolymer in said first reaction zone to an extent less than that obtained in all succeeding serially arranged reaction zones until the total monomer conversion is at least 40% and the solids content of the product of the last reaction zone is at least 25% after removal of unreacted ethylene, said first and each serially arranged additional reaction zone having a capacity of at least 0.1 m.$^3$ 2. The process as claimed in claim 1, wherein the reaction zones have a capacity of 0.1 m.$^3$ to 5 m.$^3$ and the extent of monomer conversion to copolymer is greater in each succeeding reaction zone than it is in the preceding reaction zone.

References Cited

UNITED STATES PATENTS

| | | | |
|---|---|---|---|
| 2,947,735 | 8/1960 | Bartl | 260—87.3 |
| 3,057,840 | 10/1962 | Pollock | 260—94.3 |
| 3,073,808 | 1/1963 | Mertz | 260—94.3 |
| 3,114,736 | 12/1963 | Bartl et al. | 260—87.3 |

JOSEPH L. SCHOFER, *Primary Examiner.*

HARRY WONG, Jr., *Assistant Examiner.*